United States Patent [19]
Guarriello

[11] 3,785,088
[45] Jan. 15, 1974

[54] NURSERY POT

[76] Inventor: Theodore J. Guarriello, 33 Van Blarcom Ln., Wyckoff, N.J. 07481

[22] Filed: Feb. 26, 1973

[21] Appl. No.: 335,521

[52] U.S. Cl. ............................... 47/34
[51] Int. Cl. ............................. A01g 9/02
[58] Field of Search............... 47/34, 34.13, 37, 47/1.2

[56] References Cited
UNITED STATES PATENTS

| | | | |
|---|---|---|---|
| 231,086 | 8/1880 | Pimley | 47/34 |
| 955,644 | 4/1910 | Hershkovitz | 47/34 |
| 2,814,427 | 11/1957 | Emery | 47/34 UX |
| 3,027,684 | 4/1962 | Keiding | 47/34 |
| 3,315,410 | 4/1967 | French | 47/34 |

FOREIGN PATENTS OR APPLICATIONS

| | | | |
|---|---|---|---|
| 930,534 | 7/1963 | Great Britain | 47/34.13 |
| 1,561,341 | 2/1969 | France | 47/34 |

Primary Examiner—Hubert E. Bagwill
Attorney—Donald D. Jeffery

[57] ABSTRACT

A nursery pot having a first series of vertically and circumferentially spaced, relatively large openings in the side wall of the pot, and a second series of openings at the juncture of the side wall and the bottom of the pot. Both series of openings permit drainage of excess moisture from and entry of ambient air into the pot to promote root growth, with the second series of openings being bounded by inwardly directed flanges for the purpose of directing root growth in the vicinity of the second series of openings inwardly toward the center of the pot rather than outwardly through the bottom openings.

5 Claims, 3 Drawing Figures

NURSERY POT

BACKGROUND OF THE INVENTION

The present invention relates as indicated to a nursery pot and relates more specifically to a pot or container for containing plants or nursery stock in a growing media or mixture.

DESCRIPTION OF THE PRIOR ART

Provision of drainage holes in the side walls and bottom of pots or containers of the type generally described has long been known in the art. Examples of pots having drainage openings in the side walls are U. S. Pats. Nos. 1,272,713; 2,404,370 and 955,644, with the latter also disclosing a central drain hole in the bottom wall of the container. The provision of drainage holes effects two desired results, first, the drainage from the pot of excess water or liquid thereby preventing overwatering of the plant. Secondly, the provision of drainage holes permits air to circulate more freely within the pot thereby promoting root growth and consequently resulting in faster growing plants.

The drainage holes provided in accordance with prior art techniques have been normally quite small thereby limiting both the drainage of excess liquids and the entrance and circulation of ambient air into the pot through such openings. This is true whether the drainage holes are formed in the side wall or the bottom of the pot, with bottom drainage holes having the further disadvantage that root growth can extend downwardly through such bottom openings outwardly of the pot.

SUMMARY OF THE INVENTION

A principal object of the present invention is to provide a nursery pot of the type described which is provided with a first series of vertically and circumferentially spaced, relatively large openings throughout the side wall of the pot, and a second series of openings at the juncture of the side wall and bottom of the pot thereby to readily drain surplus moisture from the pot, and to permit circulation of relatively large amounts of ambient air inwardly of the pot to promote root growth.

A further object of the present invention is to provide such a nursery pot wherein the direction of root growth adjacent the bottom of the pot is controlled so as to direct the roots inwardly toward the center of the pot rather than outwardly through such bottom openings. In accordance with the invention, each opening in said second series of openings is bounded at the sides thereof by radially inwardly directed flanges approximately equal in height to the height of said bottom openings, with said flanges functioning to direct root growth in the vicinity of said bottom openings toward the center of the pot. A similar flange of smaller radial dimension is provided at the top of each of the bottom openings for a similar purpose. In this manner, the root growth in the vicinity of such flanges is directed radially inwardly toward the center of the pot rather than outwardly through the openings, with said flanges, however, not interfering with the intended purpose of the bottom openings to provide drainage from and air circulation to the plant.

A further object of the present invention is to provide a nursery pot the material of which is impervious to the growing media and liquid nutrients introduced thereto, and which is strong and durable and capable of manufacture at relatively low cost. In the preferred form, the pot is constructed from a suitable plastic material such as polyethylene or polypropylene.

These and other objects of the present invention will be apparent as the description proceeds in particular reference to the application drawing.

BRIEF DESCRIPTION OF THE APPLICATION DRAWING

In the application drawing.

DETAILED DESCRIPTION OF THE PREFERRED EMBODIMENT

Figure 1:
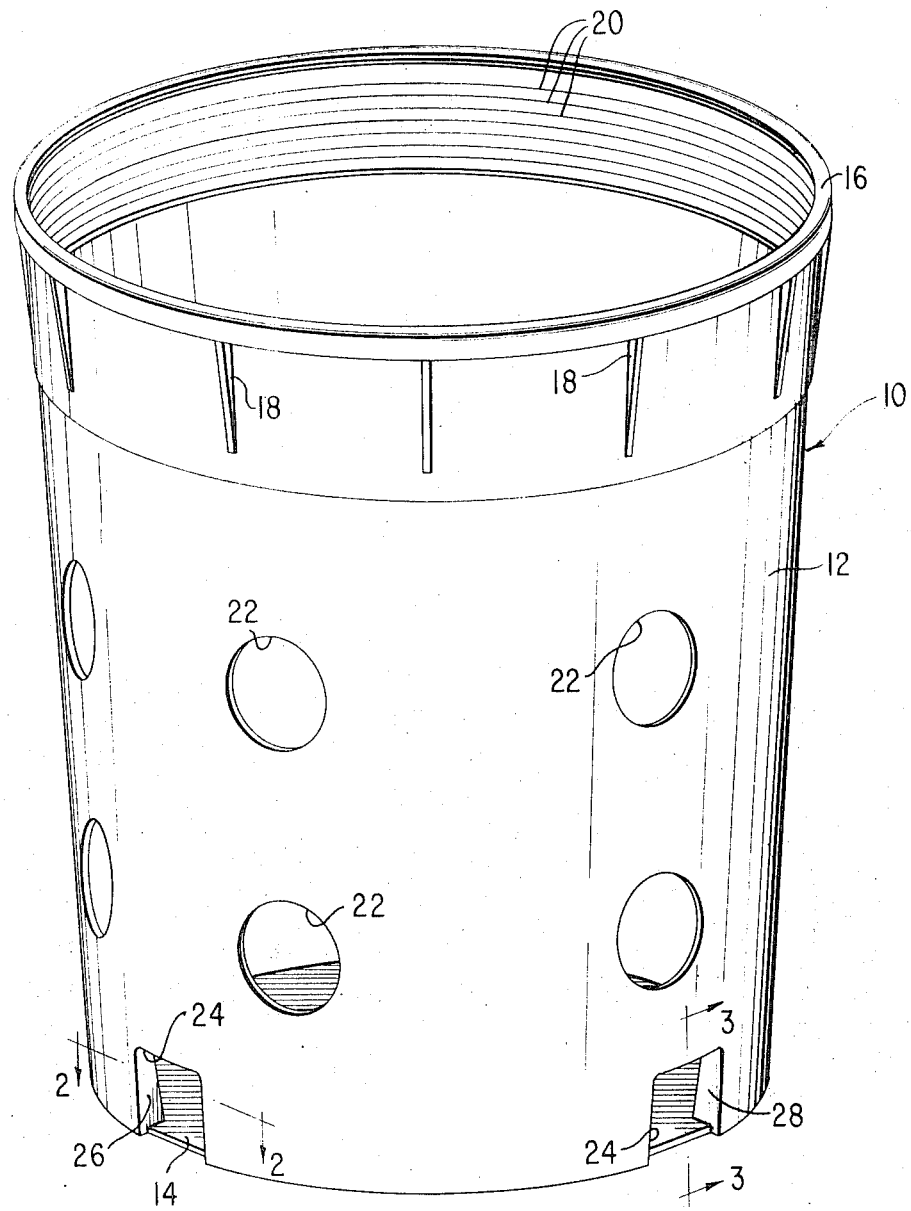
FIG. 1 is a perspective view of the nursery pot constructed in accordance with the present invention.

Referring now in more detail to the application drawing, wherein like parts are indicated by like reference numerals, the nursery pot constructed in accordance with the present invention is generally indicated at 10 and comprises a continuous side wall 12 and a bottom wall 14 integrally formed therewith. The pot is preferably formed of a semi-rigid plastic material which is impervious both to the growing media or mixture and the liquid nutrients periodically applied to the mixture. Any suitable plastic material having these characteristics is suitable, and polyethylene has proved highly satisfactory in use.

An annular bead 16 of generally inverted U-shape is formed at the top of the pot, and reinforcing ribs commonly designated at 18 are formed at the exterior of the pot immediately below the bead 16 for reinforcing the pot adjacent the top thereof. The pot is gradually tapered from the top to the bottom, and a series of vertically spaced ridges commonly designated at 20 are formed on the inner periphery of the pot at the top thereof to facilitate handling thereof. The pot is preferably molded, and it will be understood by those skilled in the art that the bead 16, ribs 18 and ridges 20 can be formed during the molding process.

A plurality of holes commonly designated at 22 are formed in the pot, with the holes extending circumferentially around the pot in vertically spaced relation. Although the holes 22 in the form shown are circular, it will be understood that other shaped openings could as well be provided. The holes are preferably formed in the pot subsequent to the molding operation, and it will be understood that the size and number of the openings may be varied depending to some degree upon the circumstances of use. In the form shown, the openings 22 are relatively large so as to provide a substantial drainage area around the side wall of the container relative to the total surface area of the side wall. It will be understood that the nursery plants in accordance with the present invention can be supplied in several sizes, with the pot illustrated in FIG. 1 representing a typical one gallon pot. In actual construction, the openings 22 for such 1 gallon pot are slightly less than 1 inch in diameter. The size of the openings 22 is limited to some extent by the type of growing media or mixture normally used in the pot. Where heavy mixtures are employed, there is little tendency for such mixture to be lost through the openings 22, with this problem being magnified when light mixtures are employed. The type of mixture can of course be easily controlled at the site of use.

A second series of openings commonly designated at 24 is formed at the juncture of the side wall 12 and the bottom wall 14, with these openings in the form shown being generally rectangular in shape. The openings 24 perform generally the same function as openings 22, thus permitting the drainage of excess moisture from the pot and the circulation of ambient air into the pot to promote root growth. Although the shape and number of the openings 24 is not critical, there is in the form shown four such openings circumferentially spaced around the pot. The openings 24 communicate with the bottom of the pot whereby excess moisture gravitating to the bottom can drain outwardly therethrough.

Figure 2:
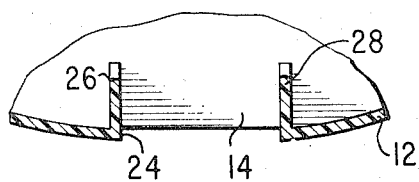
FIG. 2 is a sectional view taken on line 2—2 of FIG. 1.
Figure 3:
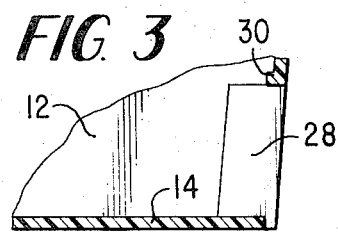
FIG. 3 is a sectional view taken on line 3—3 of FIG. 1.

An important feature of the present invention resides in the provision of flanges adjacent each of the openings 24. As best seen in FIG. 2, side flanges 26 and 28 extend radially inwardly from the sides of the openings 24 generally toward the center of the pot, and a top flange 30, FIG. 3, extends similarly radially inwardly at the top of the opening 24, with the top flange 30 being relatively reduced in dimension relative to the flanges 26 and 28.

The flanges 26, 28 and 30 function to direct root growth along the inside wall of the container in the vicinity of the openings 24 radially inwardly thereby preventing the egress of roots outwardly from the pot. It will be noted that although the openings 24 communicate with the bottom wall 14, the latter is not provided with drainage openings. In previous containers of this general type, root growth through the drainage holes in the bottom of the containers has posed somewhat of a problem.

In the form shown, the dimensions of the openings 24 are approximately 1 inch on each side thereof, and openings 24 combine with openings 22 to provide a substantially greater drainage area than previous pots of this general type. In this regard, the use of drainage holes has long been recognized, but these drainage holes normally are relatively small and frequently located relatively adjacent the bottom of the pot. In accordance with the present invention, the holes are vertically staggered throughout the side wall of the pot and comprise in totality a substantial drainage area.

Due primarily to the size and frequency of the openings 22 and 24, exceptional root growth has resulted where nursery pots in accordance with the present invention have been used. Due apparently to the unusually great amount of air circulation into the pot through the openings 22 and 24, root growth is not only more vigorous but is generally directed straight down into pot rather than around the inside wall of the pot. As well understood by those in the art, where the supply of air to the plant is restricted, the roots generally grow at random. With the continuous supply of ambient air and the moisture control provided by the drainage openings in accordance with the present invention, root growth is generally straight down and at unusually rapid rates. For example, after 4 months, typical root growth where pots of the present invention are employed extends approximately three-fourths the length of the pot, as compared with approximately 1½ to 2 inches where regular pots or cans with no openings are employed. The straight down root growth provided by the present invention also results in a healthier top growth of the plant above the soil.

It will thus be seen that the objects of the present invention have been fulfilled. The nursery pot is simple in construction and can be manufactured at relatively low cost. The holes 22 and 24 provide excellent drainage of moisture from the pot and permit the entry of substantial amounts of ambient air to enhance root growth. The flanges 26, 28 and 30 which extend around the bottom openings 24 direct any root growth in the vicinity of such bottom openings inwardly toward the center of the pot thereby inhibiting the egress of roots from the pot.

I claim:

1. A nursery pot of the type adapted to contain a growing media and a plant or plants to be grown in such media, comprising a continuous side wall and an integrally formed imperforate bottom wall, said side wall being formed with a first series of vertically and circumferentially spaced openings therearound to facilitate the drainage of excess liquid from the pot and the passage of air to the interior of said pot to enhance plant growth, said side wall being further formed relatively adjacent the bottom thereof with a second series of openings to control the direction of root growth near the bottom of said pot, each of said openings in said second series of openings being partially defined by flanges integrally formed with said side wall, said flanges extending vertically downwardly to said bottom wall and radially inwardly at both sides of each opening, said flanges serving to direct roots reaching the vicinity of said flanges radially inwardly so as to prevent the egress of such roots outwardly of the pot through said second series of openings.

2. The nursery pot of claim 1 further including a horizontally extending flange integrally formed with said side wall and extending radially inwardly across the top of each of said second series of openings between said vertical flanges.

3. The nursery pot of claim 1 wherein each of said openings in said first series of openings is approximately 1 inch in diameter and circular in cross section, and each of said openings in said second series of openings is generally rectangular in cross section and approximately 1 inch on each side thereof.

4. The nursery pot of claim 1 wherein said pot is formed of semi-rigid plastic material and is formed with a bead at the top thereof, and reinforcing ribs exteriorly of said pot and extending from and below said bead circumferentially around said pot in the upper region thereof for reinforcing the same.

5. The nursery pot of claim 4 wherein said plastic material is polyethylene.

* * * * *